106-88 AU 115 EX
8/10/76 XR 3,974,024

United States Patent [19]

Yano et al.

[11] 3,974,024

[45] Aug. 10, 1976

[54] PROCESS FOR PRODUCING BOARD OF CEMENT-LIKE MATERIAL REINFORCED BY GLASS FIBER

[75] Inventors: Tsuyoshi Yano, Tokyo; Kazumasa Ichikawa, Koganei; Takao Take, Mitako; Tetsuro Sasano, Chiba, all of Japan

[73] Assignee: Onoda Cement Company, Ltd., Japan

[22] Filed: Mar. 27, 1974

[21] Appl. No.: 455,351

[30] Foreign Application Priority Data

| | | |
|---|---|---|
| Apr. 18, 1973 | Japan | 48-43106 |
| Apr. 18, 1973 | Japan | 48-43107 |
| Apr. 18, 1973 | Japan | 48-43108 |
| May 21, 1973 | Japan | 48-33394 |

[52] U.S. Cl. .......... 162/101; 106/88; 106/89; 156/62.8; 156/78; 162/125; 162/156; 162/209; 162/213; 264/42; 264/70; 264/87

[51] Int. Cl.[2] .......... B28B 1/08; B32B 5/26; B32B 5/32; B32B 31/18

[58] Field of Search .......... 162/101, 125, 128, 129, 162/154, 156, 209, 211, 299, 300, 351, 364, 380, 201, 133, 213, 292; 65/3, 9; 264/70, 71, 87, 42, 51, 115; 425/85, 206; 106/85, 88, 89, 99; 156/62.8, 78

[56] References Cited

UNITED STATES PATENTS

| | | | |
|---|---|---|---|
| 2,007.133 | 7/1935 | Roos | 106/88 X |
| 2,782,692 | 2/1957 | Boronow et al. | 162/299 X |
| 2,913,365 | 11/1959 | Osborne et al. | 162/201 |
| 2,928,765 | 3/1960 | Kurjan | 162/129 |
| 3,050,427 | 8/1962 | Slayter et al. | 156/78 X |
| 3,062,670 | 11/1962 | Marzocchi et al. | 106/99 |
| 3,463,700 | 8/1969 | Brewster et al. | 162/351 X |
| 3,470,977 | 10/1969 | Shannon | 162/156 X |

*Primary Examiner*—S. Leon Bashore
*Assistant Examiner*—Richard V. Fisher
*Attorney, Agent, or Firm*—Wenderoth, Lind & Ponack

[57] ABSTRACT

This invention relates to a process for continuously producing a dense board of cement-like material reinforced by glass fiber, which comprises (1) preparing a slurry of cement-like material; (2) simultaneously spraying the cement-like slurry and short lengths of glass fiber on a suction conveyor in such a manner that the cement-like slurry stream and the glass fiber stream intersect on the suction conveyor to form a dense mat of an intimate mixture of the two; and (3) dehydrating the mat by pulse-like intermittent suction using one or more suction boxes before the cement-like material begins to set, and to an apparatus used in carrying out the process.

This invention further relates to a process for continuously producing a light board of air-dispersed cement-like material reinforced by glass fiber, which comprises (1) preparing a slurry of cement-like material having air dispersed therein; and (2) simultaneously spraying the air-dispersed cement-like slurry and short lengths of glass fiber on a conveyor belt in such a manner that the air-dispersed cement-like slurry stream and the glass fiber stream intersect on the conveyor to form an air-dispersed mat of an intimate mixture of the two, and to an apparatus used in carrying out the process.

This invention still further relates to a process for continuously producing a laminated board by overlaying the above produced air-dispersed board on the above produced dense board, and to an apparatus used in carrying out the process.

3 Claims, 3 Drawing Figures

PROCESS FOR PRODUCING BOARD OF CEMENT-LIKE MATERIAL REINFORCED BY GLASS FIBER

BACKGROUND OF THE INVENTION

This invention relates to a process for continuously producing a stiff board, which is made from a cement-like material reinforced by glass fiber, having a high density suitable for use as a building material such as for partitions between rooms, and to an apparatus used in the carrying out the process.

This invention also relates to a process for continuously producing a light strong stiff board, which is made from an air-dispersed cement-like material reinforced by glass fiber, suitable for use as a building material such as for fire-proof coverings, sound-proofing materials and partitions, and to an apparatus used in the working of the process.

This invention also relates to a process for continuously producing a laminated board suitable for use as a building material such as for a partition, which comprises overlaying the air-dispersed board on the above dense stiff board, and to an apparatus used in the working of the process.

Heretofore, in preparing a stiff cement board reinforced by glass fiber, there has been suggested a "premix method" by which a board is formed after mechanically mixing glass fiber, cement powder or slurry thereof; a method which comprises individually forming a cement slurry and glass fiber into layers and then laminating the two layers; and a "spray method" as used in preparing a reinforced plastic.

The reinforcement by glass fiber becomes most effective when glass fiber having a length of 25 – 50 mm is added to a matrix in an amount of 6 – 15%, and is homogeneously dispersed throughout the matrix and is preferably disposed two-dimensionally with respect to the flat face.

However, in using a "premix method," it is difficult to homogeneously disperse glass fiber through a matrix, and it is also difficult to incorporate glass fiber having a length longer than 10 mm in an amount of more than 3% by weight. Moreover, in such a method, the glass fiber is extensively damaged since it is mixed with the matrix under vigorous stirring, and the glass is disposed three-dimensionally whereby the reinforcement is less effective.

In using a method which comprises laminating a glass fiber layer with a cement layer, the adhering area between the glass fiber and the cement is small, and accordingly the total adhesive force between the two components is small whereby the reinforcement is less effective.

In using a "spray method" as used in preparing a reinforced plastic, it is difficult to disperse glass fiber homogeneously through a cement material and to obtain a smooth surface since the fluidity and other properties of the cement slurry are quite different from those of the polymer.

One of the conventional laminated boards having a cement material as a main component comprises cement-asbestos plates between which a light cement material is charged. Another one comprises laminating a cement-asbestos plate with a gypsum board. The former is prepared by charging a light cement material between cement-asbestos plates fixed at a predetermined distance. The latter is prepared by binding a cement-asbestos plate and a gypsum board by means of a binding agent. In both cases, the element materials are individually preformed, and thereafter are fixed into the final product. Thus, the conventional products are prepared by at least two steps, and therefore from the economical points of view the productivity is low.

SUMMARY OF THE INVENTION

One object of this invention is to provide a process and an apparatus for continuously producing a stiff board having a high density and a uniform thickness by spraying a cement-like slurry and glass fiber on a suction conveyor in order that the glass fiber may be suitably disposed in the cement matrix thereby reinforcing the matrix to the maximum, the cement-like slurry stream and the glass fiber stream being intimately mixed in the spraying space to obtain a uniform dispersion.

Another object of this invention is to provide a process and an apparatus for continuously producing a stiff board having a high density and a uniform thickness by dehydrating a mat formed from the sprayed mixture of cement-like slurry and glass fiber on a suction conveyor by intermittent suction in a pulse system, the suction being adjustable so that the sprayed mat may be satisfactorily dehydrated without creating any cracks through too rapid suction.

Yet another object of this invention is to provide a process and an apparatus for continuously producing a light stiff board having a uniform thickness by spraying glass fiber and a cement-like slurry having air dispersed therein on a suction conveyor in order that the glass fiber may be suitably disposed in the cement matrix thereby reinforcing the matrix to the maximum, the glass fiber stream and the cement-like slurry stream having air dispersed therein being intimately mixed in the spraying space to obtain a uniform dispersion.

A further object of this invention is to provide an economical process and apparatus for continuously producing a laminated board in a highly productive manner by continuously laying the above produced light stiff board on the above-produced dense stiff board on a suction conveyor in a short time.

Thus, the laminated board of this invention is made by (a) spraying a cement-like slurry and glass fiber on a suction conveyor in order that the glass fiber may be suitably disposed in the cement matrix thereby reinforcing the matrix to the maximum, the cement-like slurry stream and the glass fiber stream being intimately mixed in the spraying space to obtain a uniform dispersion; (b) dehydrating the mat formed from the sprayed mixture of cement-like slurry and glass fiber on the suction conveyor by intermittent suction in a pulse system, the suction being adjusted so that the sprayed mat may be efficiently dehydrated without creating any cracks through too rapid suction; and (c) spraying glass fiber and a cement-like slurry having air dispersed therein on the above produced dense board in the same manner as above to form a light board layer on the dense board layer.

DESCRIPTION OF THE PREFERRED EMBODIMENTS

The accompanying drawings illustrate the preferred embodiments of this invention.

Figure 1:
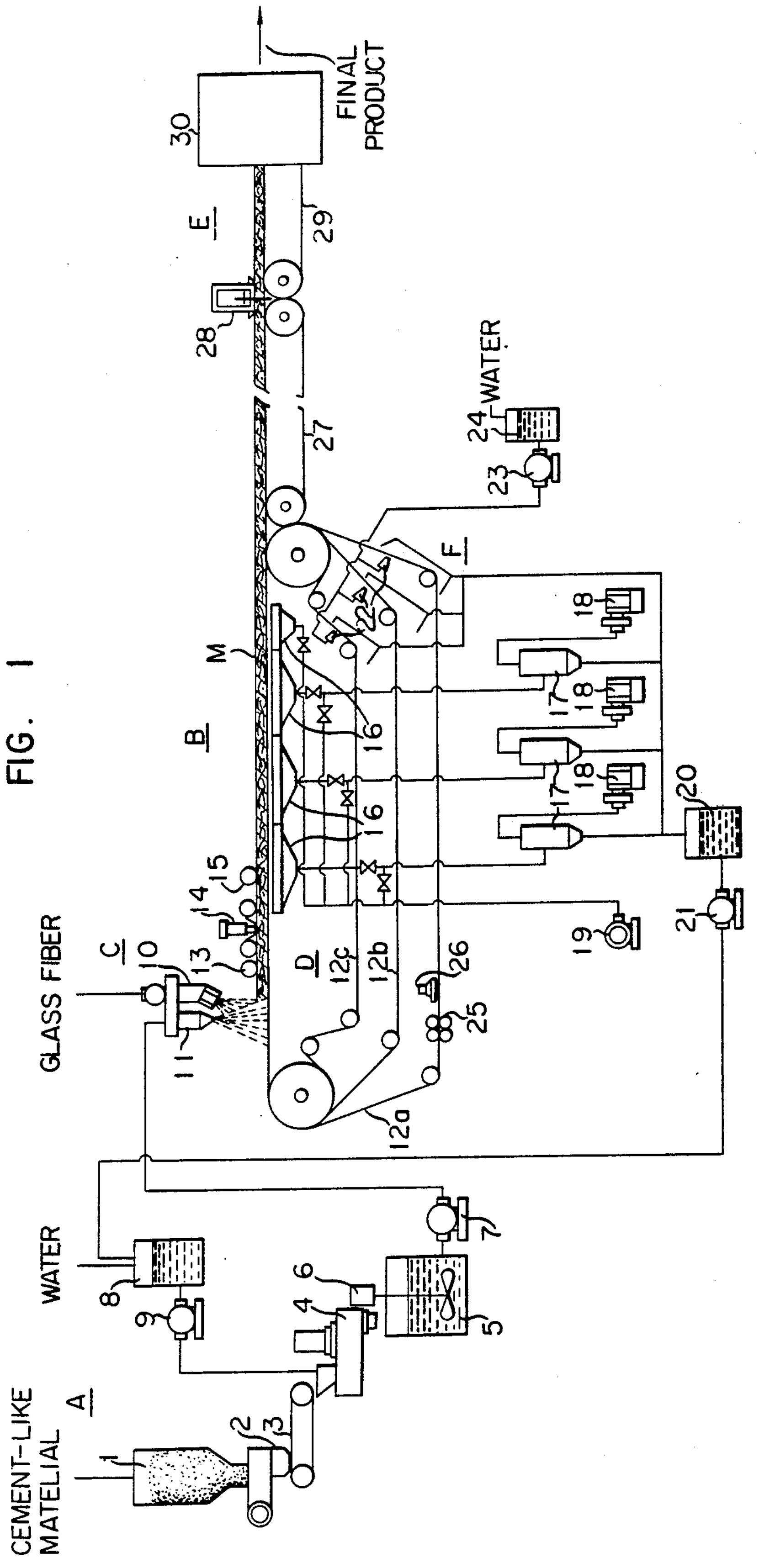
FIG. 1 shows an outline of an apparatus for continuously producing a stiff board having a high density in accordance with the present invention.

First, reference is made to FIG. 1 which illustrates an apparatus for continuously producing a stiff board having a high density.

This apparatus shown in FIG. 1 comprises part A where a cement-like slurry is prepared; suction conveyor B; part C which continuously and simultaneously sprays the cement-like slurry and glass fiber onto the suction conveyor B in such a manner that the cement-like slurry stream and the glass fiber stream intersect on the suction conveyor B to form a mat M of an intimate mixture of the two; part D which dehydrates the sprayed cement-like material glass fiber mat M by suction; and part E which conveys, cuts and cures the dehydrated mat M.

The cement-like material employed in this invention is a water-curable powdered cement such as Portland cement, alumina cement, magnesia cement or the like and gypsum such as calcium sulfate hemihydrate, insoluble anhydrite or the like. The efficiency of dehydration by suction is remarkably influenced by the particle size of the cement-like material. The partical size suitable for vacuum drying is larger than 40 $\mu$, more preferably larger than 170 $\mu$. However, taking setting time and strength of hydration of the cement-like material into consideration, the preferable particle size is smaller than 200 $\mu$. Accordingly, in order to raise the efficiency of dehydration, it is significant to arrange the particle size or to classify cement particles before making a slurry and to spray larger particles and smaller particles separately.

The cement-like material employed in this invention may optionally contain a setting regulator to control the setting rate, a setting retarder to secure an efficient spraying operation and a smooth surface on the final product, a setting accelerator to reduce the curing time thereby securing easy handling after moulding, a quality improver to raise its strength and water-proofing property, and an additive to secure uniform dispersion of the cement-like slurry and glass fiber.

In part A where a cement slurry is prepared, powdered cement-like material in tank 1 is forwarded through powder supplier 2 in a fixed quantity, and is conveyed by conveyor 3 to mixer 4. At the same time, water or an aqueous solution in tank 8 is forwarded by pump 9 to the mixer 4 where the cement powder and the water are mixed in a fixed ratio, and the resultant slurry mixture is stored in tank 5 where the slurry is stirred by stirrer 6. The thus obtained slurry is forwarded to spraying means C by pump 7.

The spraying means C comprises spray gun 11 for making a spray stream of cement-like slurry and spray instrument 10 equipped with a roving cutter for making a stream of short lengths of glass fiber.

The glass fiber employed in this invention may be an ordinary glass fiber, but alkali-resistant glass fiber is preferable when cement is employed.

The glass fiber is added in an amount of 2 – 30% by weight, and the average length of cut glass fiber is 10 – 50 mm. The cement-like slurry and short-lengths of glass fiber are simultaneously and continuously sprayed onto the suction conveyor B by spraying means C.

The spray gun 11 producing a cement-like slurry stream and the spray instrument 10 producing a glass fiber stream are positioned above the suction conveyor B in such a manner that the cement-like slurry stream and the glass fiber stream intersect on the suction conveyor B, and therefore the sprayed cement and glass fiber are intimately mixed on the conveyor B.

Depending on the final product to be produced, if desired, one or more spray guns and spray instrument may be equipped, and also they may be movable along the conveyor while spraying cement-like slurry and glass fiber towards the conveyor.

The cement-glass fiber mat M thus obtained preferably has a thickness of 3 – 50 mm. The dehydration efficiency of a mat having a thickness of more than 50 mm becomes bad.

Suction conveyor B comprises a filter cloth 12*a* on the outside, a porous steel belt 12*b* and a rubber belt 12*c* having an uneven surface. These three belts are washed with water by a shower washer 22 in washing means F as illustrated in FIG. 1. The filter cloth 12*a* is then dehydrated and dried by dehydrating roller 25 and suction box 26. Water is supplied from tank 24 through pump 23 to the shower washer 22 in the washing means F.

Mat M formed on suction conveyor B is dehydrated by suction means D. The suction means D comprises one or more suction boxes 16 to which a gas-liquid separator 17, a vacuum pump 18 and a blower 19 are connected. The respective gas-liquid separators 17 are connected with tank 20 which collects the filtrates. The collected water in the tank 20 is recycled to tank 8 by pump 21. Thus, the dehydration of mat M is carried out by suction boxes 16 through filter cloth 12*a*, porous steel belt 12*b* and uneven rubber belt 12*c*. The degree of the reduced pressure necessary to carry out the dehydration is determined depending on the characteristic of the final product required but a pressure of 650 mm Hg is generally preferred. Thus, it is possible to vary the characteristic of the final product by controlling the vacuum pressure. When the strength of the product is not such a necessary requirement, the dehydration need not be carried out. On the other hand, when the strength of the product is required to be at a maximum, as much of the water which is unnecessary for hydration of the cement-like material should be removed as possible, and therefore the reduced pressure should be the maximum. The dehydration by suction should be carried out before the cement starts to set since the efficiency of the dehydration becomes extremely bad after setting starts. Calcium sulfate hemihydrate, soluble anhydrite and jet cement generally start to set about 10 minutes after contact with water, and insoluble anhydrite, Portland cement and the other cements start to set about 50 minutes after contact with water.

The conditions of suction by the vacuum pump can be adjusted in such a manner that the efficiency of dehydration may be raised; the dehydration rate may be changed depending on the part of product; the reduced pressures of the respective suction boxes may be individually controlled to avoid cracks in a mat caused by rapid suction; and the dehydration may be effected intermittently, in a pulse-like manner.

On the last suction box 16, compressed air may be blown onto mat M dehydrated by a blower 19 in order to facilitate separation between the mat and conveyor B.

The face of mat M may be finished as desired by optionally providing a finishing roll 13, a surface-finishing vibrating plate 14 and a roll 15 having a desired pattern after spraying means C.

The thus prepared mat is forwarded by conveyor 27, and starts to set as it is moving along the conveyor. The mat is then cut into a predetermined length by a cutter 28 when it has set to a predetermined extent, and is forwarded by another conveyor 29 to curing means 30 where the mat is cured to produce the final product.

In the above manner, a dense stiff board having a uniform thickness is continuously produced in accordance with this invention by spraying cement-like material and short lengths of glass fiber onto a suction conveyor and dehydrating the cement-glass fiber mat by pulse-like intermittent suction.

Figure 2:
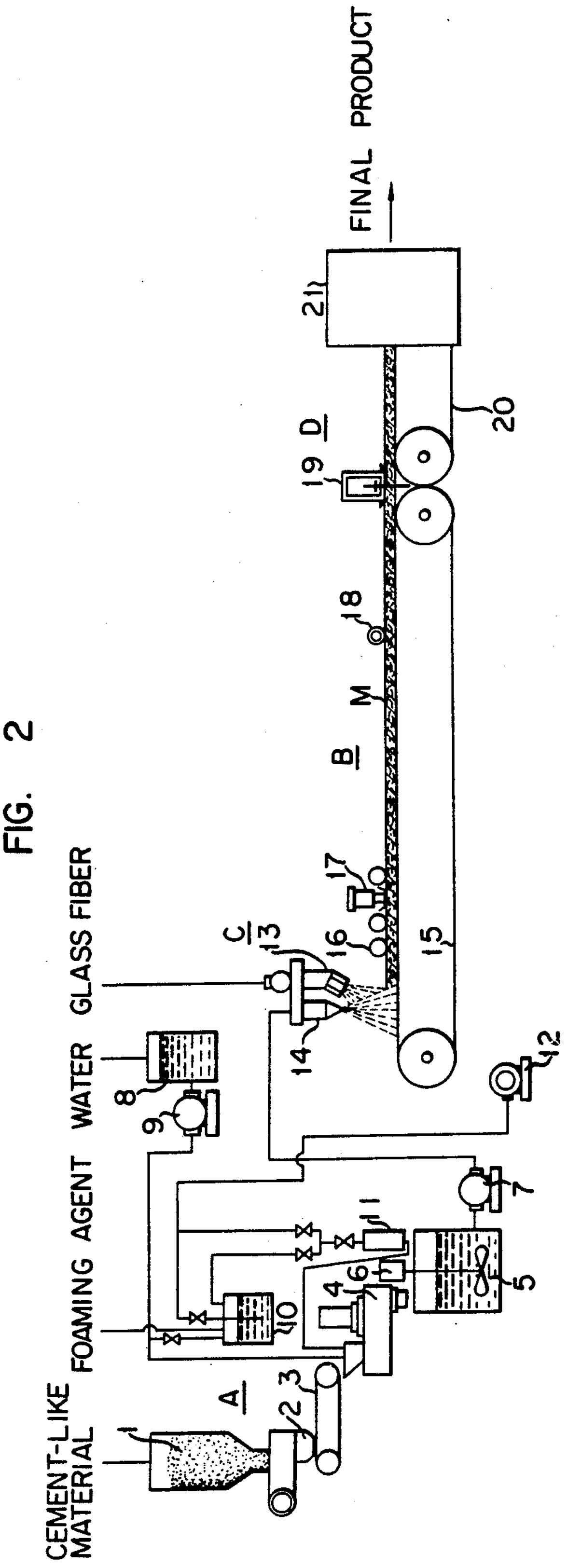
FIG. 2 shows an outline of an apparatus for continuously producing a light stiff board having air dispersed therein in accordance with the present invention.

Secondly, reference is made to FIG. 2 which illustrates an apparatus for continuously producing a light board of air-dispersed cement-like material reinforced by glass fiber.

This apparatus shown in FIG. 2 comprises part A where a slurry of cement-like material having air dispersed therein is prepared; conveyor belt B; part C which continuously and simultaneously sprays the air-dispersed cement-like slurry and short lengths of glass fiber onto the conveyor belt in such a manner that the cement-like slurry stream and the glass fiber stream intersect on the conveyor to form an air-dispersed mat of an intimate mixture of the two; and part D where the sprayed cement-like material glass fiber mat M having air dispersed therein is surface-treated, cut and cured.

In part A where a cement-like material slurry having air dispersed therein is prepared, powdered cement-like material in tank 1 is forwarded through powder supplier 2 in a fixed quantity, and is conveyed by conveyor 3 to mixer 4. At the same time, water or an aqueous solution in tank 8 is forwarded by pump 9 to the mixer 4 and tank 10 where the water and a foaming agent are mixed. Fine air bubbles supplied to the mixer 4 are prepared by mixing a foaming agent and water in tank 10 under aeration by blower 12 and by forwarding the produced air bubbles to foaming machine 11. The foaming agent employed in this invention includes saponin, gelatin and the like. In the mixer 4, the cement-like material, water and air bubbles are intimately mixed in a fixed ratio, and the resultant slurry mixture is stored in tank 5 while the slurry is being stirred by stirrer 6.

The preparation of the air-dispersed cement-like slurry is carried out by measuring the density of the slurry and considering the change of specific gravity on spraying and setting and the defoaming to be expected in the subsequent steps. In this manner, by blowing air into the cement-like slurry, it is possible to produce a board having a bulk specific gravity of about 0.4.

The cement-like slurry thus prepared having air dispersed therein is forwarded by pump 7 to spraying means C where the slurry is sprayed by spray gun 14.

Glass fiber is added in an amount of 0.5 – 5% by weight, and the average length of cut glass fiber is 10 – 50 mm.

The cement-like slurry having air dispersed therein and short lengths of glass fiber are simultaneously sprayed onto the conveyor belt B respectively through a spray gun 14 and a spray instrument 13 equipped with a roving cutter in a continuous manner.

The spray gun 14 producing an air-dispersed cement-like slurry stream and the spray instrument 13 producing a glass fiber stream are equipped above the conveyor belt B in such a manner that the slurry stream and the glass fiber stream intersect on the belt B, and consequently the sprayed cement-like material and glass fiber are intimately mixed.

In the same manner as in the apparatus of FIG. 1, one or more spray guns and spray instruments may be provided, and also they may be reciprocally movable across the belt while spraying the slurry and the glass fiber towards the belt.

The thus obtained cement-glass fiber mat M preferably has a thickness of 20 – 150 mm.

The face of mat M is finished as desired by optionally providing a finishing roll 16, a surface-finishing vibrating plate 17 and a roll 18 having on it a desired pattern.

The thus prepared mat begins to set as it is moving along conveyor belt B, and is then cut into a predetermined length by cutter 19 when it has set to a predetermined extent. The cut mat is forwarded by another conveyor belt 20 to curing means 21 where the mat is cured to produce the final product.

In the above manner, in accordance with the present invention, there is continuously provided an air-dispersed stiff board having a uniform thickness in which cement-like material is reinforced by glass fiber evenly dispersed therein.

Figure 3:
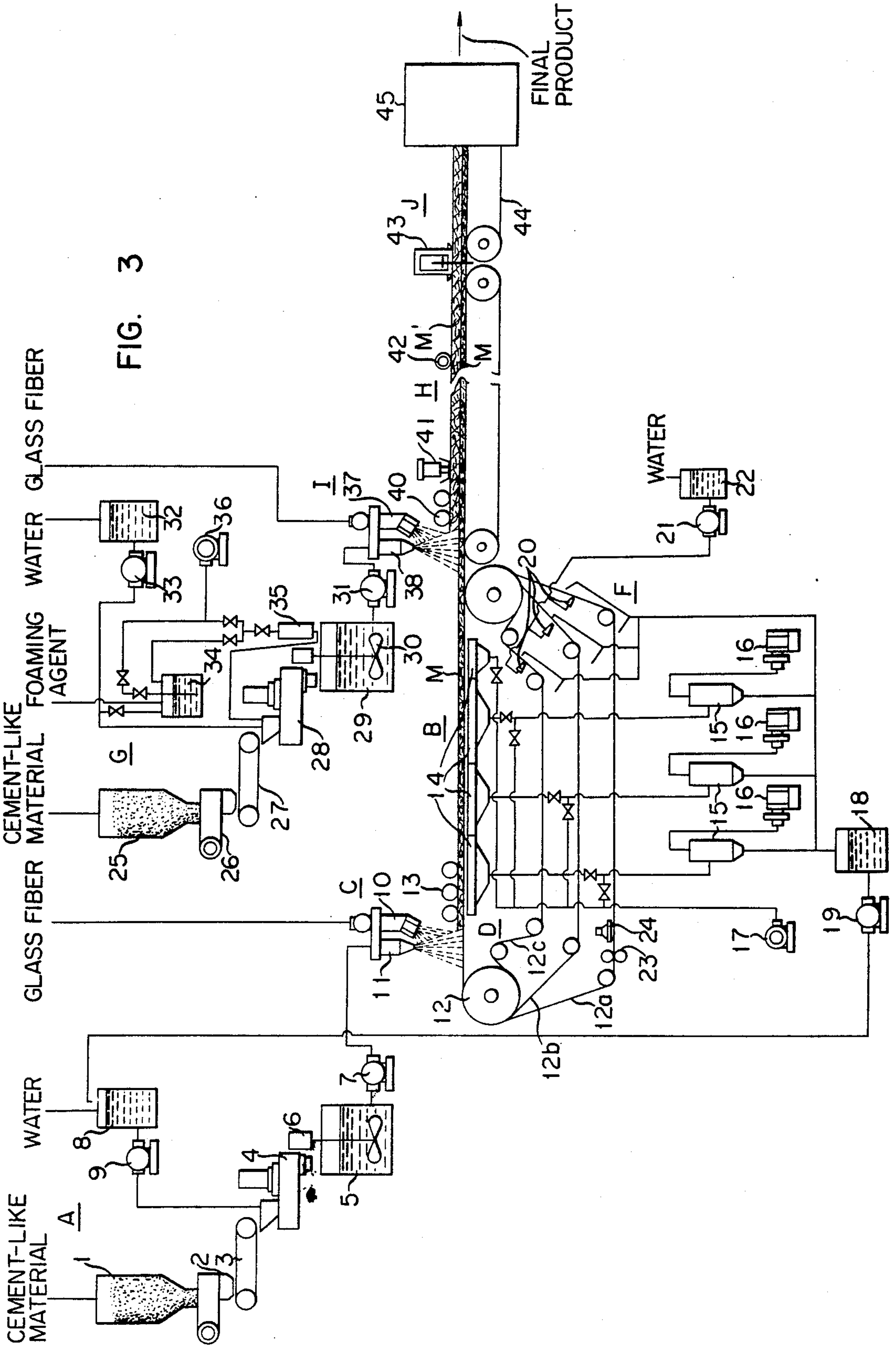
FIG. 3 shows an outline of an apparatus for continuously producing a laminated board by overlaying the air-dispersed stiff board on the dense stiff board in accordance with the present invention.

Thirdly, reference is made to FIG. 3 which illustrates an apparatus for continuously producing a laminated board by overlaying the air-dispersed board prepared by the apparatus of FIG. 2 on the dense board prepared by the apparatus of FIG. 1.

This apparatus shown in FIG. 3 is a combination of the apparatus of FIG. 1 and that of FIG. 2. It comprises part A where a slurry of a cement-like material is prepared; suction conveyor B; part C which continuously and simultaneously sprays the cement-like material slurry and short lengths of glass fiber on the suction conveyor in such a manner that the cement-like slurry stream and the glass fiber stream intersect on the conveyor B to form a dense mat M of an intimate mixture of the two; part D which dehydrates the sprayed cement-glass fiber mat M by suction; part G where a slurry of cement-like material having air dispersed therein is prepared; conveyor belt H; part I which continuously and simultaneously sprays the air-dispersed cement-like material and short lengths of glass fiber on the dehydrated dense mat M in such a manner that the cement-like slurry stream and the glass fiber stream intersect on the dense mat M to form an air-dispersed mat of an intimate mixture of the two; and part J where the thus prepared laminated mat is cut and cured.

The laminated board is prepared by combining the process as illustrated in FIG. 1 with the process as in FIG. 2.

In part A where a slurry of cement-like material is prepared, powdered cement-like material in tank 1 is forwarded through a powder supplier 2 in a fixed quantity, and is conveyed by a conveyor 3 to a mixer 4. At the same time, water or an aqueous solution in tank 8 is forwarded by pump 9 to the mixer 4 where the powdered cement-like material and the water are mixed in a fixed ratio, and the resultant slurry mixture is stored in tank 5. The slurry mixture in tank 5 is stirred by stirrer 6, and is forwarded to spray gun 11 of spray means C by pump 7. The cement-like slurry and short lengths of glass fiber are simultaneously sprayed onto the suction conveyor B respectively through spray instrument 10 equipped with a roving cutter in such a manner that the slurry stream and the glass fiber stream intersect on the suction conveyor B.

Suction conveyor B comprises a filter cloth 12*a* on the outside, a porous steel belt 12*b* and a rubber belt 12*c* having an uneven surface. These three belts are washed with water by a shower washer 20 in washing means F. The filter cloth 12*a* is then dehydrated and dried by dehydrating roller 23 and suction box 24. Water is supplied from tank 22 through pump 21 to shower washer 20 in the washing means F.

Mat M formed on suction conveyor B is dehydrated by suction means D. The suction means D comprises one or more suction boxes 14 to which gas-liquid separator 15, vacuum pump 16 and blower 17 are connected. The respective gas-liquid separators 15 are connected with tank 18 which collects the filtrates. The collected water in the tank 18 is recycled to tank 8 by pump 19. Thus, the dehydration of mat M is carried out by suction boxes 14 through filter cloth 12*a*, porous steel belt 12*b* and the uneven rubber belt 12*c*.

The face of mat M may be finished flat, or rough so that the dense mat and air-dispersed mat are firmly laminated onto each other, by optionally providing one or more surface-finishing rolls 13 including a roll having needles after spraying means C.

The thus prepared dense mat is forwarded on another conveyor belt H where an air-dispersed mat is overlaid on it.

As hereinbefore illustrated with reference to FIG. 2, cement-like material powder in tank 25 is forwarded through powder supplier 26 in a fixed quantity, and is conveyed to mixer 28 by conveyor 27. At the same time, water or an aqueous solution in tank 32 is forwarded by pump 33 to the mixer 28 and tank 34. Fine air bubbles supplied to the mixer 28 from foaming machine 35 are prepared by mixing a foaming agent and water in tank 34 under aeration by blower 36 and by forwarding the produced air bubbles to foaming machine 35. In the mixer 28, the cement-like material, water and air bubbles are intimately mixed in a specific ratio, and the resultant slurry mixture is stored in tank 29 while the slurry is being stirred by stirrer 30.

The cement-like material slurry thus prepared having air dispersed therein is forwarded by pump 31 to spray gun 38 of spraying means I. The cement-like slurry having air dispersed therein and short lengths of glass fiber are simultaneously sprayed on the previously prepared dense mat M respectively through spray gun 38 and spray instrument 37 equipped with a roving cutter in such a manner that the slurry stream and the glass fiber stream intersect on the dense mat to form a laminated mat having an air-dispersed mat overlaid on the dense mat. The first spraying means C and the second spraying means I may be the same.

The face of the laminated mat is finished optionally depending on its use by a finishing roll 40, a surface-finishing vibrating plate 41 and a roll 42 having a desired pattern. Then, the laminated mat begins to set as it moves along the conveyor belt, and is cut into a predetermined length by cutter 43 when it has set to a predetermined extent. The cut mat is consequently forwarded by another conveyor belt 44 to curing means 45 where the mat is cured to produce a laminated board having an air-dispersed board firmly overlaid on a dense board.

In preparing the first layer of the dense mat, cut glass fiber is added in an amount of 2 – 30% by weight, the average length of which is 10 – 50 mm. The thickness of the first layer is generally 3 – 50 mm. On the other hand, in preparing the second layer of the air-dispersed mat, cut glass fiber is added in an amount of 0.5 – 5% by weight, the average length of which is 10 – 50 mm. The thickness of the second layer is preferably 20 – 150 mm.

The cement-like materials used in preparing the first and the second layers may be the same or may be different. Additives can be optionally incorporated depending on the use.

In accordance with this invention, it is also possible to produce a board of sandwich structure by further overlaying a dense mat on the above prepared laminated board.

In the above manner, according to this invention, there is continuously provided a laminated board having an air-dispersed board overlaid on a dense board.

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the present invention.

We claim:

1. A process for continuously producing a dense board of cement-like material reinforced by glass fibers, said process comprising:

preparing a slurry of cement-like material selected from the group consisting of water-curable powdered cement and gypsum having a particle size of $40\mu - 200\mu$;

spraying said slurry and glass fibers having a fiber length of 10 mm – 50 mm in an amount of 2 – 30% by weight simultaneously onto a suction conveyor in such a manner that the slurry and the glass fibers intersect on the suction conveyor to form a dense mat of a thickness of 3 – 50 mm having said glass fibers intimately disposed substantially two-dimensionally with respect to the surface of said suction conveyor;

dehydrating said dense mat on said conveyor by pulse-like intermittent suction using at least one suction box before the cement-like material begins to set; and cutting said dehydrated dense mat into predetermined board lengths.

2. A process for continuously producing a light board of air-dispersed cement-like material reinforced by glass fibers, said process comprising: :

preparing a slurry of cement-like material selected from the group consisting of water-soluble powdered cement and gypsum of a particle size of less than $200\mu$ having air dispersed therein;

spraying said air-dispersed slurry and glass fibers having a fiber length of 10 – 50 mm in an amount of 0.5 – 5% by weight simultaneously onto a conveyor belt in such a manner that said air-dispersed slurry and said glass fibers intersect on the conveyor to form an air-dispersed mat of a thickness of 20 – 150 mm having said glass fibers intimately disposed substantially two-dimensionally with respect to the surface of said conveyor; and cutting said air-dispersed mat into predetermined board lengths.

3. A process for continuously producing a laminated board having a light board of air-dispersed cement-like material reinforced by glass fibers overlaid onto a dense board of cement-like material reinforced by glass fibers, said process comprising:

preparing a slurry of cement-like material of a particle size of 40μ – 200μ selected from the group consisting of water-curable powdered cement and gypsum;

spraying said slurry and glass fibers having a fiber length of 10 – 50 mm in an amount of 0.5 – 5% by weight simultaneously onto a first suction conveyor in such a manner that the slurry and the glass fibers intersect on said suction conveyor to form a dense first mat of a thickness of 3 – 50 mm having said glass fibers intimately disposed substantially two-dimensionally with respect to the surface of said suction conveyor;

dehydrating said dense mat on said conveyor by pulse-like intermittent suction using at least one suction box before the cement-like material begins to set;

transferring said dehydrated mat onto a second conveyor;

preparing a slurry of cement-like material of a particle size of less than 200μ selected from the group consisting of water-curable powdered cement and gypsum having air dispersed therein;

spraying said air-dispersed slurry and glass fibers having a fiber length of 20 – 50 mm in an amount of 2 – 30% by weight simultaneously onto the said dense first mat, which has been dehydrated and is on said second conveyor, in such a manner that the air-dispersed slurry and said glass fibers intersect on said dense first mat to form a laminated board having an air-dispersed second mat overlaid on said dense first mat, said air-dispersed mat having a thickness of 20 – 150 mm and having said glass fibers intimately disposed substantially two-dimensionally with respect to the surface of said second conveyor; and cutting said laminated board into predetermined board lengths.

* * * * *